United States Patent Office 3,631,067
Patented Dec. 28, 1971

3,631,067
PREPARATION OF COUMARIN
Robert J. Nankee, Midland, and Charles F. Fosberry, Sanford, Mich., assignors to The Dow Chemical Company, Midland, Mich.
No Drawing. Filed Jan. 5, 1970, Ser. No. 844
Int. Cl. C07d 7/28
U.S. Cl. 260—343.2 R                              7 Claims

ABSTRACT OF THE DISCLOSURE

In the process for preparing coumarin by reacting salicylaldehyde with an alkali metal acetate and acetic anhydride, separation of the product is improved without detrimentally affecting the yield by maintaining the molar concentration of alkali metal acetate at or below the concentration of the total salicylaldehyde employed in the reaction and then separating the coumarin from the reaction mixture by distillation.

BACKGROUND OF THE INVENTION

The preparation of coumarin by the Perkin reaction is well known. Britton and Livak in U.S. Pat. 2,204,008, for example, show the preparation of coumarin by the Perkin reaction by reacting at least one mole of alkali metal acetate per mole of salicylaldehyde. Using these reactant ratios, the product must be washed with water prior to the recovery of the coumarin. It was felt that this aqueous wash had two beneficial effects: first, the wash removed undesirable impurities which prevented the separation of the coumarin from the reaction mixture; and second, the aqueous wash was believed to hydroylze a portion of the crude product to increase the yield of coumarin.

SUMMARY OF THE INVENTION

According to the present invention, it has now been found that the hydrolysis and washing step considered necessary by the art is unnecessary and even detrimental to the recovery of a substantial amount of the coumarin and usable by-products. The elimination of this hydrolysis and washing step of the art is made possible by using equal molar or excess salicylaldehyde in the reaction. If such a reactant ratio is maintained, the reaction may be conveniently fractionally distilled without prior washing to isolate the coumarin, coumarin precursors and by-products.

The important aspect of the present invention is the maintenance of the molar concentration of the alkali metal acetate at or below the molar concentration of the salicylaldehyde employed in the reaction. As a general rule, the salicylaldehyde and alkali metal acetate are introduced into the reaction initially and no further additions of either of the reactants is made. The concentration of the alkali metal acetate is preferably maintained below about 0.8 mole of acetate per mole of the original salicylaldehyde, with the reaction of about 0.2 to about 0.6 mole of acetate per mole being especially preferred. At lower concentrations of alkali metal acetate, the reaction proceeds, slowly, and at concentrations above equal molar amounts, coumarin cannot be readily separated by distillation.

Although any alkali metal acetate may be employed in the reaction, sodium and potassium salts are preferred, with sodium acetate being of special interest.

The third reactant employed in a Perkin preparation of coumarin is acetic anhydride. Ordinarily, acetic anhydride is added gradually or periodically over the duration of the reaction to give a molar excess of acetic anhydride based upon the original salicylaldehyde, although the amount of acetic anhydride used may vary widely. The addition of about 1 to about 4 moles of acetic anhydride is preferred, with the use of about 1.5 to about 3 moles per mole of the salicylaldehyde being especially preferred.

The condensation of the present invention may be carried out by heating the mixture of salicylaldehyde, acetic anhydride and anhydrous alkali metal acetate up to temperatures of about 200° C. for a total reaction time of about 2 to about 10 hours. During the course of the reaction, the acetice acid formed is usually vaporized and removed from the reaction mixture.

After the completion of the reaction, the components of the reaction mixture are separated by fractional distillation. Heretofore, fractional distillation of the final reaction product has been essentially impossible. With the advent of the present invention, however, such distillation is both possible and advantageous, while the washing and hydrolysis step previously considered to be required for acceptable yields may be eliminated.

The conditions of the fractional distillation may vary widely. In the preferred distillation, temperatures of about 80° to about 250° C. are employed, with 100° to 190° C. being especially preferred. At temperatures below 80° C., the reaction mixture is usually very viscous or solid and cannot be readily distilled. At temperatures above 250° C., decomposition of the desired product is possible without the compensating benefits of a better distillation.

Within the preferred temperature conditions, subatmospheric pressure is required to distill the reaction mixture. Such pressure may vary widely so long as the pressure is low enough to maintain a reasonable rate of distillation. Generally, pressures of about 1 mm. to about 300 mm. of Hg are required with pressures of 5 mm. to about 100 mm. being preferred.

Thus, according to the present invention, coumarin may be separated directly from the reaction mixture without prior washing or hydrolysis by conducting the reaction at reactant ratios where the concentration of the alkali metal acetate is at or below the molar concentration of the salicylaldehyde employed in the reaction.

SPECIFIC EMBODIMENT

In a 200 ml. round-bottomed flask equipped with a stirrer, a 12" x 1" Vigreux column, water-cooled condenser and receiver, 346 g. of salicylaldehyde and 70 g. of sodium acetate were mixed to a smooth slurry under ambient conditions, and 185 g. of acetic anhydride was added to the mixture. The reaction mixture was gradually heated from room temperature to 160° C. in one hour and another 185 g. of acetic anhydride was added. The reaction mixture was then heated to 180° C. during the second hour, another 185 g. of acetic anhydride was added and the temperature was maintained at 180° C. during the third hour. As the reaction temperature approached 160° C., acetic acid was distilled from the mixture, and 393 g. was collected over the three-hour reaction. At the end of the reaction, the reaction mixture weighed 567 g. and was analyzed to contain 40.5% coumarin. 288 grams of the mixture was charged into a 500 ml. round-bottomed flask as the molten liquid at 70° C. and fractionally distilled under 8 mm. of Hg up to a final pot temperature of 210° C. Of the 202 g. of material distilled, 110.5 g. was coumarin to account for 94.7% of the coumarin initially present and the remaining 91.5 g. were by-products and coumarin precursors. The residue contained less than 0.6% coumarin and about 50% sodium acetate.

In the same manner as described by the example above, coumarin can be prepared by the Perkin reaction by reacting 1 mole or less of sodium acetate per mole of salicylaldehyde in the presence of 1 to 4 moles of acetic anhydride per mole of salicylaldehyde at a temperature of up to about 200° C. The product of this reaction can then be fractionally distilled at a temperature of up to about 250° C. under reduced pressure. Also in the same manner, other alkali metal acetates may be employed in the reaction to give essentially the same results. For example, potassium acetate or cesium acetate may be employed in place of sodium acetate.

We claim:

1. In the process for preparing coumarin by reacting salicylaldehyde, alkali metal acetate and acetic anhydride, the improvement comprising maintaining the molar concentration of the alkali metal acetate at or below the concentration of salicylaldehyde employed in the reaction and then separating the coumarin from the reaction mixture by distillation.

2. The process of claim 1 wherein less than 0.8 mole of alkali metal acetate is reacted per mole of the salicylaldehyde.

3. The process of claim 2 wherein 0.2 to 0.6 mole of alkali metal acetate is reacted per mole of the salicylaldehyde.

4. The process of claim 1 wherein the alkali metal acetate is sodium acetate.

5. The process of claim 1 wherein 1 to 4 moles of acetic anhydride are reacted per mole of the salicylaldehyde.

6. The process of claim 1 wherein the coumarin is distilled from the reaction mixture at 80° to 250° C.

7. The process of claim 1 wherein the coumarin is distilled from the reaction mixture at a pressure of 1 to 300 mm. Hg.

References Cited

UNITED STATES PATENTS 3,201,406   8/1965   Moffett _____ 260—343.2 X

JOHN M. FORD, Primary Examiner